(12) United States Patent
Li

(10) Patent No.: US 10,013,057 B1
(45) Date of Patent: *Jul. 3, 2018

(54) SYSTEM AND METHOD FOR PROVIDING INFORMATION

(71) Applicant: Chian Chiu Li, Fremont, CA (US)

(72) Inventor: Chian Chiu Li, Fremont, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/802,427

(22) Filed: Nov. 2, 2017

Related U.S. Application Data

(63) Continuation of application No. 15/494,464, filed on Apr. 22, 2017.

(51) Int. Cl.
*G06F 3/01* (2006.01)
*G06F 3/16* (2006.01)
*G06Q 30/02* (2012.01)

(52) U.S. Cl.
CPC .............. *G06F 3/013* (2013.01); *G06F 3/167* (2013.01); *G06Q 30/0241* (2013.01)

(58) Field of Classification Search
None
See application file for complete search history.

(56) References Cited

U.S. PATENT DOCUMENTS

2017/0228017 A1* 8/2017 Li ........................... G06F 3/013

* cited by examiner

*Primary Examiner* — Kenneth B Lee, Jr.

(57) ABSTRACT

Systems, methods and apparatus for presenting information using idle time slot. In an aspect, when a standby or idle device detects that a user gazes at it, it starts showing contents on its display automatically. In another aspect, when a standby or idle device detects that a user shakes or taps on it, it starts gaze sensing. If the user gazes at the device, it begins to show contents automatically. The contents may include advertisements.

20 Claims, 6 Drawing Sheets

SYSTEM AND METHOD FOR PROVIDING INFORMATION

CROSS REFERENCE TO RELATED APPLICATION

Figure 1:
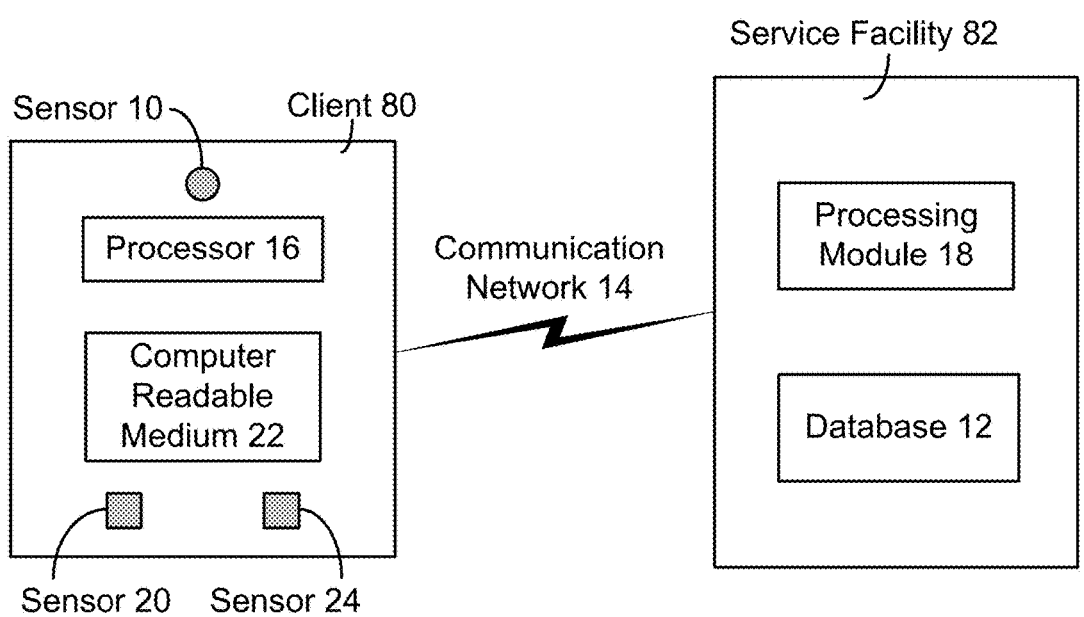

This is a continuation of U.S. application Ser. No. 15/494,464, filed Apr. 22, 2017, which is a division of U.S. application Ser. No. 14/217,486, filed Mar. 18, 2014, now U.S. Pat. No. 9,671,864, granted Jun. 6, 2017.

FEDERALLY SPONSORED RESEARCH

Not applicable

SEQUENCE LISTING OR PROGRAM

Not applicable

BACKGROUND

Field of Invention

This invention relates to providing information, more particularly to providing information using idle device, user's idle time period, and eye-tracking technology.

Description of Prior Art

When a smartphone is standby, its display may turn dark to save energy. Without user intervention, the smartphone would stay that way. In some cases, a user may not want to play with a standby phone, because he or she may be busy doing other things. In some other cases when a user is not busy, he or she may still be reluctant to awake a phone from standby state, if there isn't anything curious or interesting. In the latter scenario, a user may have time to take or view information, while a smartphone may have a blank screen ready to display and convey info. However, there lack convenient ways and incentives for a user to start it. As a consequence, the phone may continue to be idle, while a user may just gaze at a dark empty screen, causing a waste of time for both the user and phone.

Accordingly, there exists a need to utilize idle time of smart phone and other electronic devices to present information to idling users.

Advertisements represent a major revenue source for many internet service providers and communication companies. When users surf on the Internet or communicate with each other, however, most hold a rather negative attitude towards advertisements, which often tend to present contents in an intrusive, disruptive, obtrusive, or even rude manner. Intrusive ads include unexpected pop-up, unwelcome or oversized banners, or annoying flashing objects or pictures. On the other hand, advertisements made to be less intrusive often end up being ignored or less effective due to a weak or subtle appearance. In both cases, either users are offended, or ad effect is in doubt.

Thus, it is desirable to have a method and system which provide advertising information in a less-intrusive but effective way. Because an idle device sometimes means an idling user, it may be less intrusive and probably more effective to present advertisements utilizing idle device in an unused time slot. But so far most internet advertisements appear at a rather awkward time, competing with programs a user is running or annoying a user who is already busy enough.

Therefore once again, there exists a need to utilize idle time of electronic devices like smartphones or tablet computers to present information. The idle time may be especially useful for showing advertising contents to idle users.

OBJECTS AND ADVANTAGES

Accordingly, several main objects and advantages of the present invention are:

a). to provide an improved method and system for presenting information;

b). to provide such a method and system which utilize idle or standby time of a device;

c). to provide such a method and system which target users who may have free time;

d). to provide such a method and system which utilize idle time slot to present information, including advertisements; and e). to provide such a method and system which monitor the gaze direction of a user to determine when to present information and when to stop a presentation.

Further objects and advantages will become apparent from a consideration of the drawings and ensuing description.

SUMMARY

In accordance with the present invention, methods and systems are proposed to use idle time period for providing information to users, e.g., smartphone and tablet computer users. More specifically, methods and systems are proposed to provide information when a device is idle or standby and a user happens to have free time too. In one embodiment, when a user gazes at a blank screen of an idle device, indicating the user might not be engaged in anything, the device may take the opportunity to present news, updates, or other information. In another embodiment, when a user taps a standby or idling device, and then looks at its screen, the device may take the taps and gaze as a predetermined command to show scheduled information on the screen. Information presented may include advertisements. As viewers are idling users, ads presented may be considered less intrusive. In addition, without competing contents, ads may catch full attention of users, becoming more effective.

DRAWING FIGURES

FIG. 1 is an exemplary block diagram describing one embodiment in accordance with the present invention.

Figure 2:
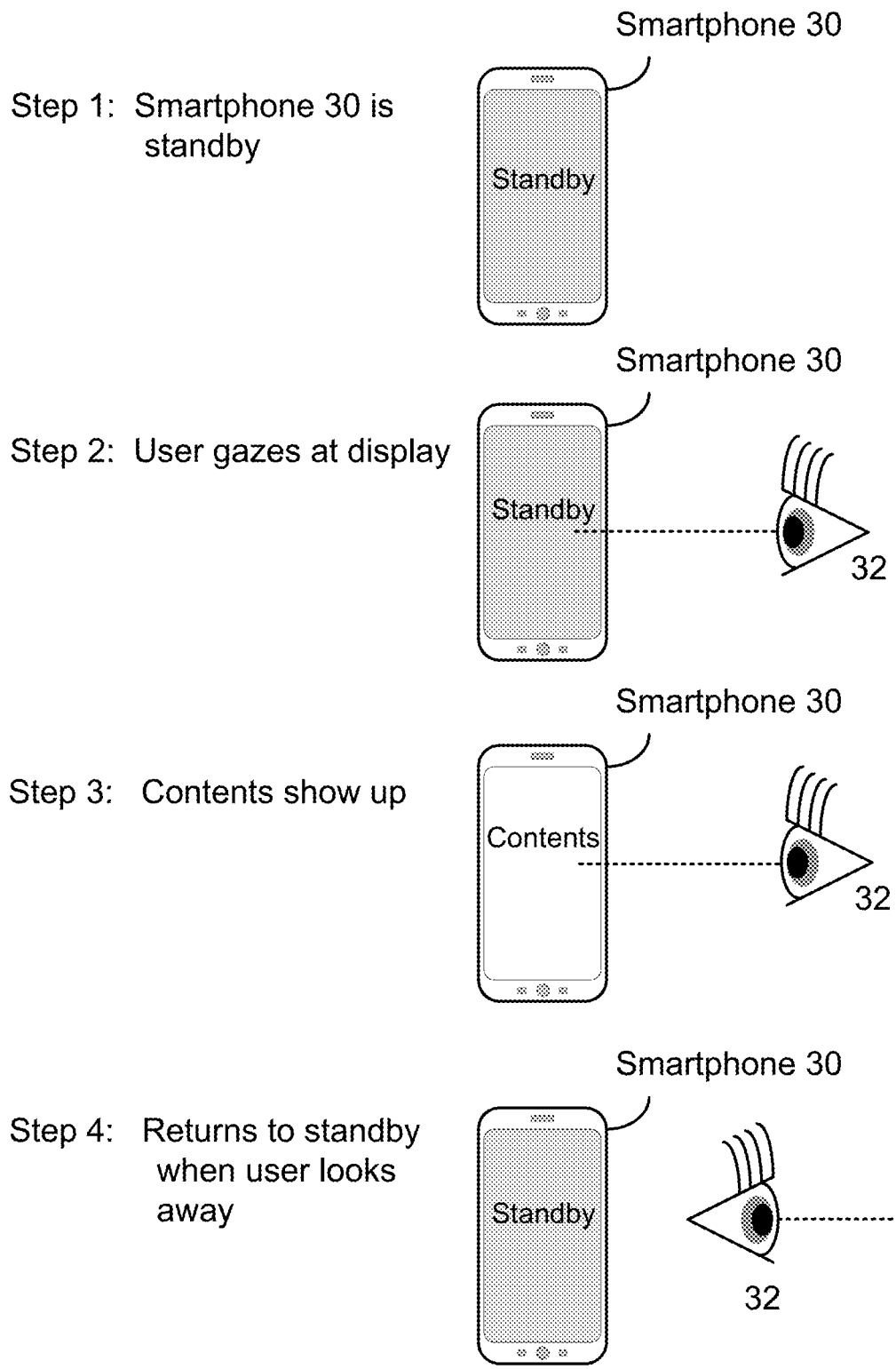

FIG. 2 displays exemplary diagrams showing one embodiment in accordance with the present invention.

Figure 3:
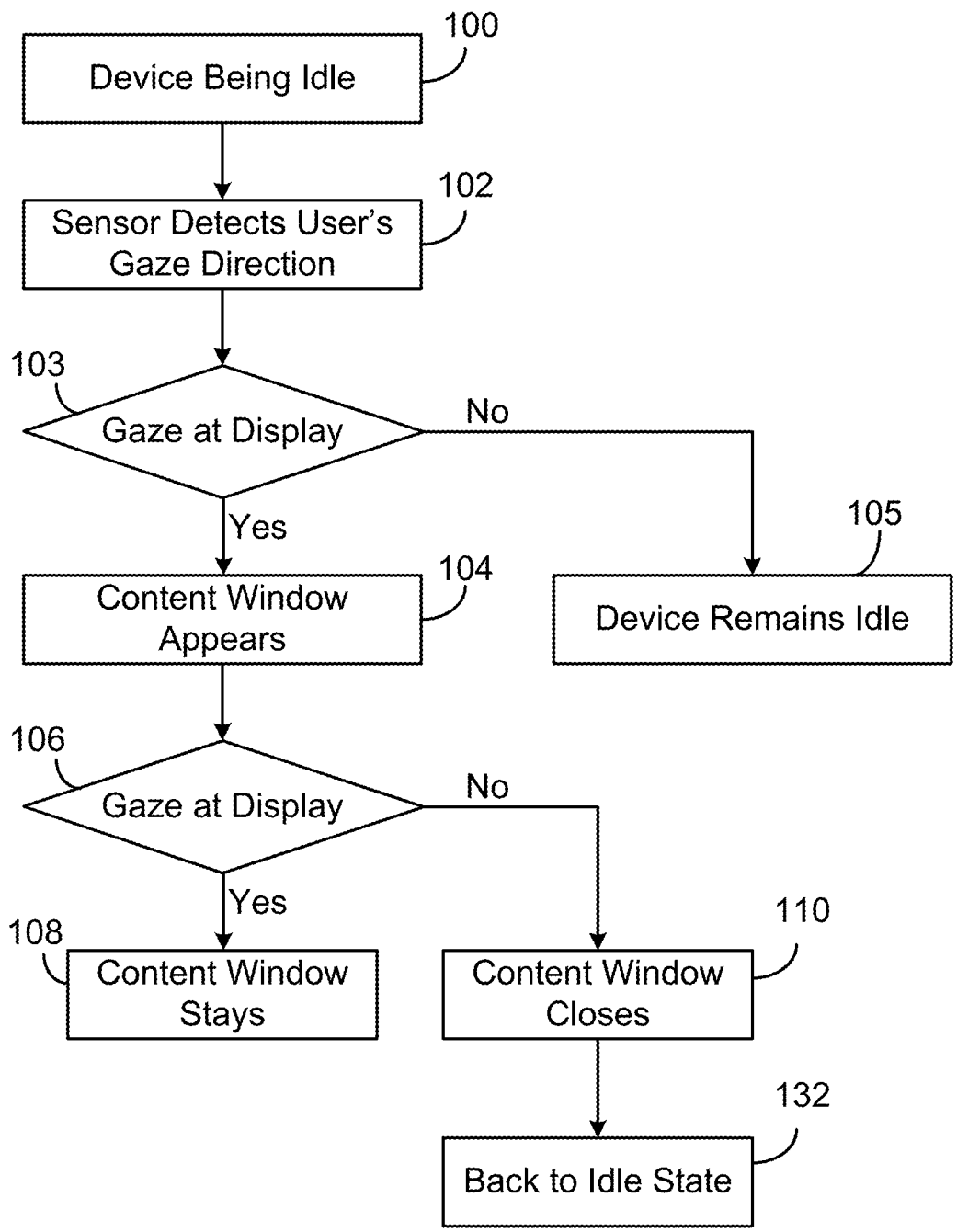
Figure 4:
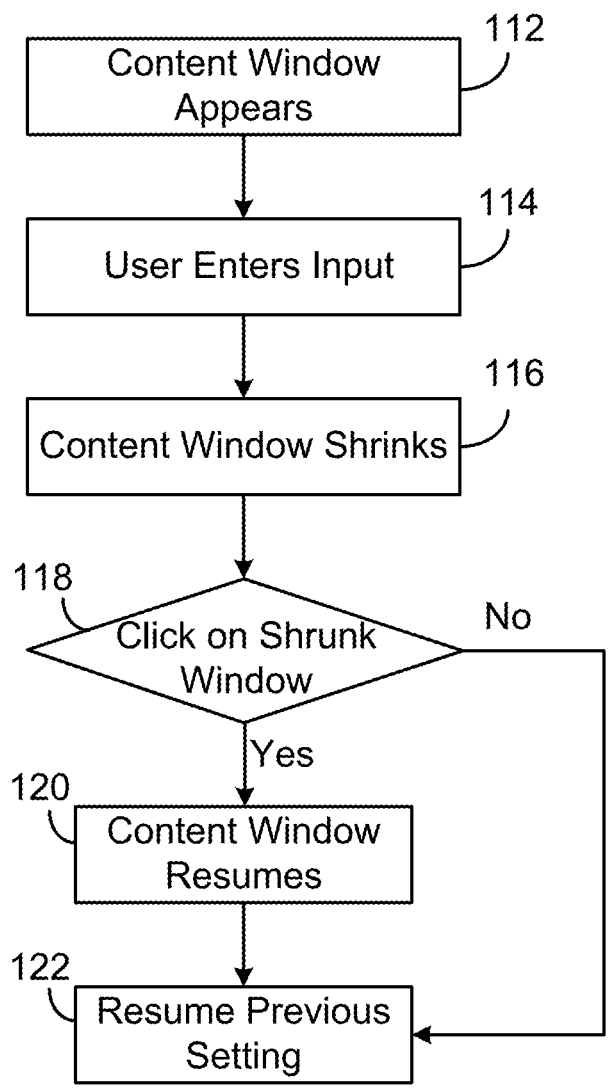
Figure 5:
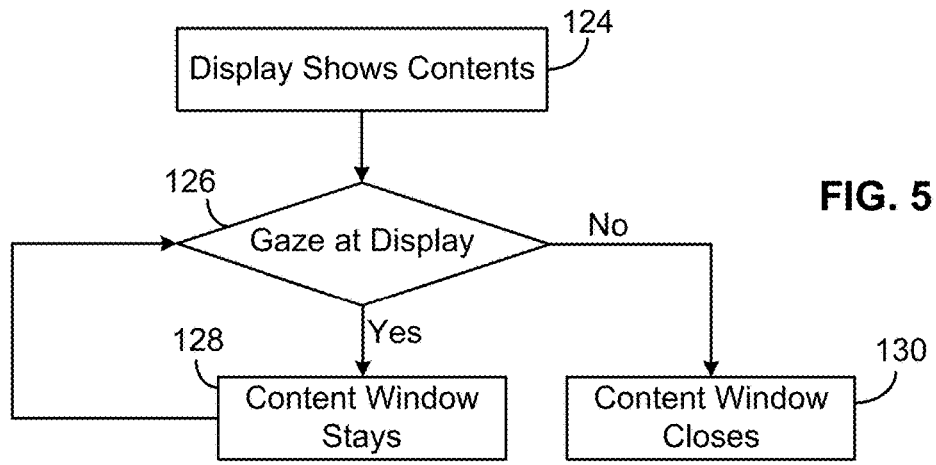

FIGS. 3, 4 and 5 are exemplary flow diagrams showing respective embodiments in accordance with the present invention.

Figure 6:
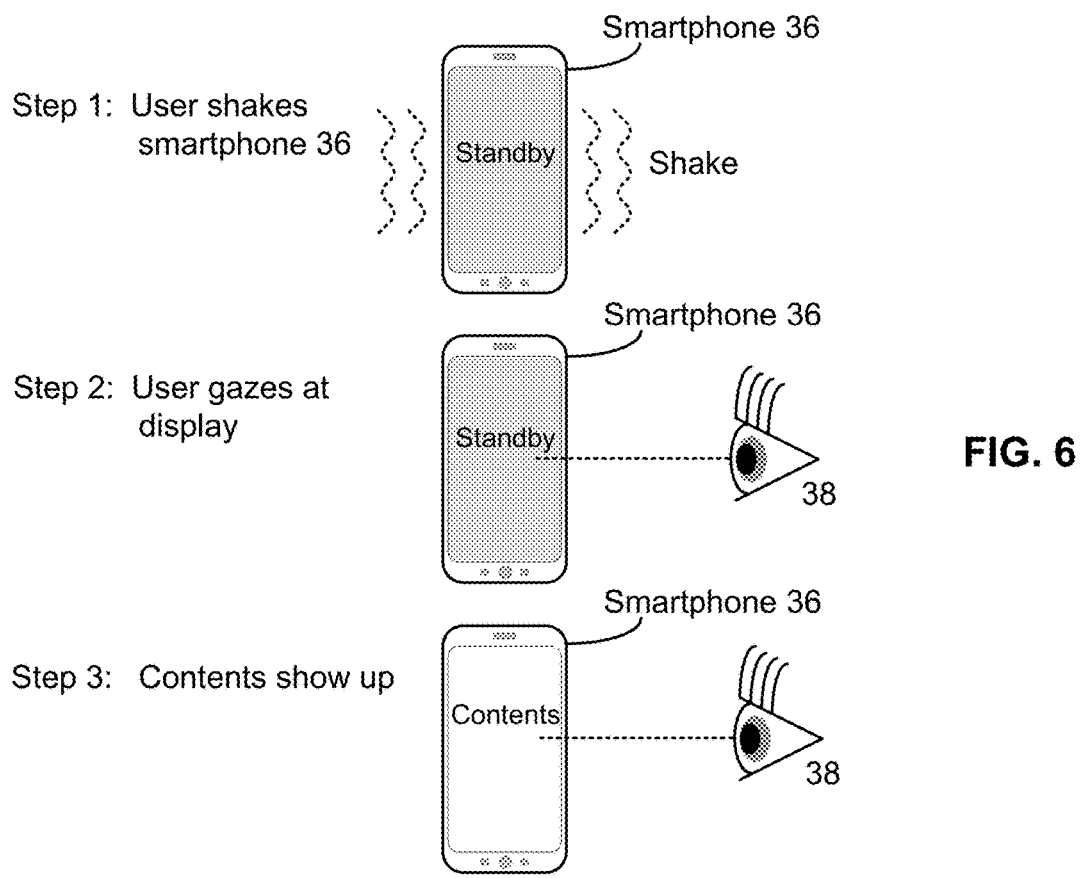

FIG. 6 displays exemplary diagrams showing another embodiment in accordance with the present invention.

Figure 7:
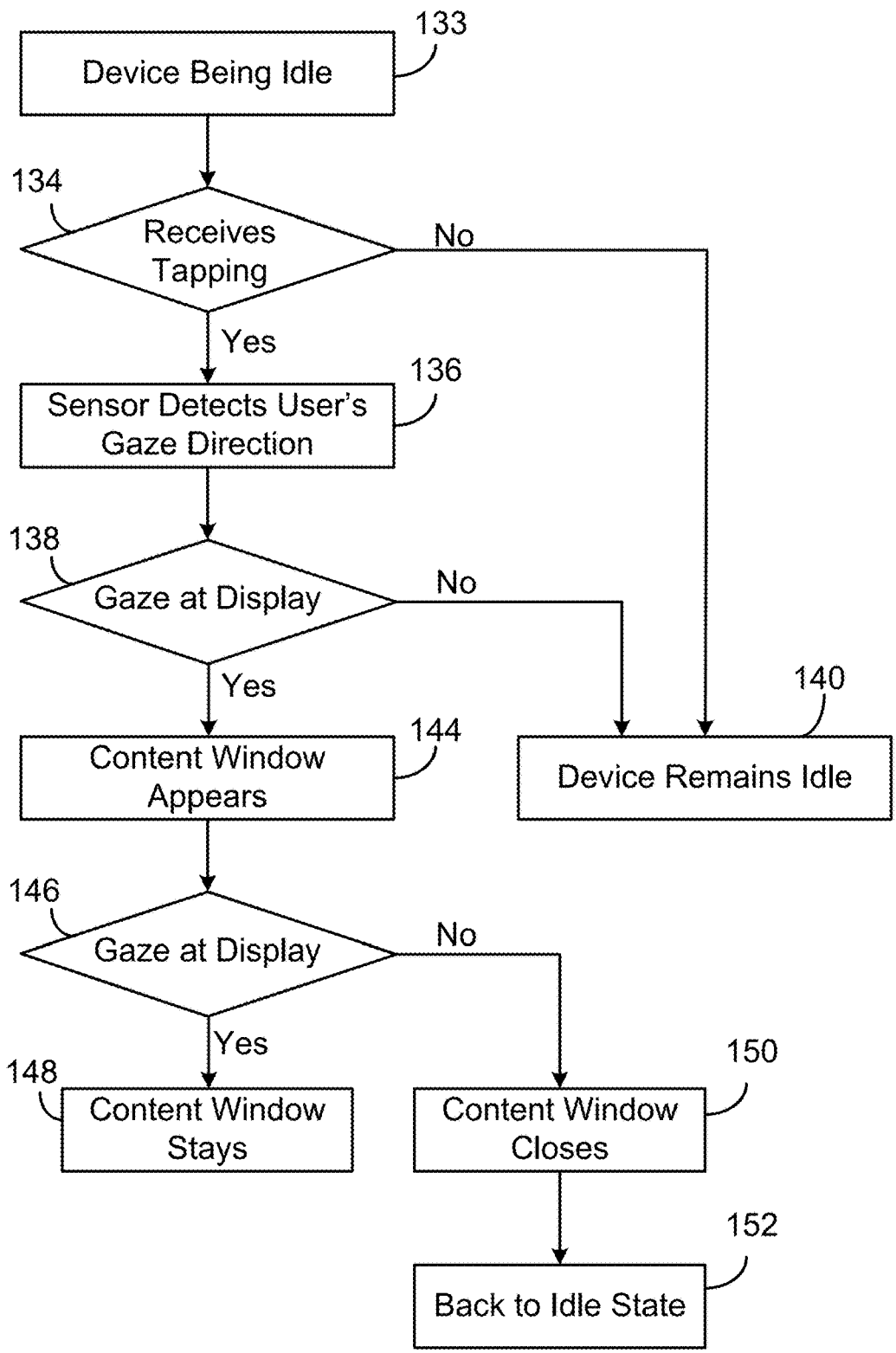

FIG. 7 is an exemplary flow diagram showing steps of the embodiment depicted in FIG. 6 in accordance with the present invention.

REFERENCE NUMERALS IN DRAWINGS

10 Sensor
12 Database
14 Communication Network
16 Processor
18 Processing Module 20 Sensor
22 Computer Readable Medium
24 Sensor
30 Smartphone
32 Eye
36 Smartphone
38 Eye
80 Client System
82 Service Facility
100, 102, 103, 104, 105, 106, 108, 110, 112, 114, 116, 118, 120, 122, 124, 126, 128, 130, 132, 133, 134, 136, 138, 140, 144, 146, 148, 150, 152 are exemplary steps.

DETAILED DESCRIPTION

FIG. 1 is an exemplary block diagram of one embodiment according to the present invention. A client system 80 and service facility 82 are connected via a communication network 14. Client 80 may represent an electronic device, including but not limited to a desktop computer, a handheld computer, a tablet computer, a wireless gadget (such as mobile phone, smart phone, smart watch, media player, personal digital assistant (PDA), and the like), digital television (DTV), internet protocol television (IPTV), play station, etc. Client 80 may include a processor 16 and computer readable medium 22. Processor 16 may mean one or more processor chips or systems. Medium 22 may include a memory hierarchy built by one or more memory chips or storage modules like RAM, ROM, FLASH, magnetic, optical and/or thermal storage devices. Processor 16 may run programs or sets of executable instructions stored in medium 22 for performing various functions and tasks, e.g., playing games, playing music or video, surfing on the Internet, email receiving and transmitting, displaying advertisements, etc. Client 80 may also include input, output, and communication components, which may be individual modules or integrated with processor 16. Usually, client 80 may have a display with a graphical user interface (GUI). The display surface may also be sensitive to touches, especially in the case of tablet computer or smart phone. Client 80 may also have a voice recognition component to receive audio input from a user.

Service facility 82 may include a processing module 18 and database 12. Module 18 may contain one or more servers and storage devices to receive, send, store and process related data or information.

The word "server" means a system or systems which may have similar functions and capacities as one or more servers. Main components of server may include one or more processors, which control and process data and information by executing software, logic, code, or carrying out any other suitable functions. A server, as a computing device, may include any hardware, firmware, software, or a combination. In the most compact form, a server may be built on a single processor chip. In the figure, module 18 may contain one or more server entities that collect, process, maintain, and/or manage information and documents, perform computing and communication functions, interact with users, deliver information required by users, etc. Database 12 may be used to store the main information and data related to users and the facility. The database may include aforementioned memory chips and/or storage modules.

A communication network 14 may cover a range of entities such as the Internet or the World Wide Web, a local area network (LAN), a wide area network (WAN), a metropolitan area network (MAN), a telephone network, an intranet, wireless, and other types of networks. Client 80 and facility 82 may be connected to network 14 by various wired, wireless, optical, or other connections.

Client 80 may include a sensor 10 which tracks the eye of a user using mature eye-tracking technologies. The sensor may be arranged very close to the screen of a display and designed to obtain a picture of the facial part of a user. The system may recognize whether a user's gaze is in such a direction that the eye sight may fall on the display screen of client 80. In other words, sensor 10 may be employed to determine whether a user is looking at the screen of a device through proper algorithms. Sensor 10 may be built using imaging technologies, and the image of a user's eye may be analyzed to decide which direction the user is looking at. Both visible and infrared light may be employed for eye-tracking. In the latter case, an infrared light source may be arranged to provide a probing beam.

Client 80 may also include a sensor 20 which functions as a motion detector, which is well known in the art and employed at some devices already. Sensor 20 may be used to detect the movement of an object outside of the device. It may include a camera-like system to obtain images and then recognize any movement through image analysis over a period of time. As sensor 10 has imaging taking capabilities, sensor 10 may be arranged to work both as an eye-tracking device and as a motion detector, which is desirable when small size is required.

Furthermore, client 80 may contain a sensor 24 to detect its own movement by sensing acceleration, deceleration, and rotation. Sensor 24 may employ one or multiple accelerometers, gyroscopes, and/or pressure sensors for performing various measurement tasks which may include detecting device shaking, device vibration, user running, user walking, and so on.

FIG. 2 shows exemplarily one embodiment according to the present invention. The essence is to utilize sleeping devices to bring info to idle users. In Step 1 of the figure, a smartphone 30 is standby or idling, with a dark screen showing nothing. In Step 2, a user gazes at the screen, reflected by an eye 32 looking at it. If the gazing time elapses beyond a certain value, it may be interpreted as the user might have spare time and might be willing to view info presented on the screen. Then in Step 3, the screen lights up and contents are presented. The user may continue to look at the screen and view the contents, or turn his or her sight away from the screen. If the user redirects gaze direction to elsewhere for a certain period of time, it may be deemed as not wanting to watch the contents any more. Then the screen may turn dark and the smartphone may become idle or standby again, as depicted in Step 4.

Contents presented on an idling device may include any category of information such as breaking news, regular news, market updates, newly-arrived shared photos, email alert, text messages, video clips, advertisements, community events, sports, and so on. A user may choose what information may be presented. A user may also rely on a program and/or a service provider, which is connected to a device via communication networks, to arrange contents to be presented.

FIG. 3 is a schematic flow diagram illustrating one embodiment of providing information according to the present invention. The process starts with Step 100, occurrence of an idle device, meaning no user is actively doing anything with it and the idle mode has been there for a while. A device being idle or standby may mean the device has been in that state for some time, beyond a given period. Examples of idling device may include a desktop computer or tablet computer running by itself for a certain period of time without any input from users, a computer or tablet computer running on screen-saver mode, a cell phone or smartphone in standby state, i.e., ready to receive incoming calls while in a lower-power energy-saving state, or in general, a running electronic device with a lower or much lower power consumption setting and probably a blank screen if it has one, etc. Next, in Step 102, the device detects a user's gaze and analyzes whether the user looks at its display, by sensor 10 in FIG. 1 for example. In Step 103, if the user doesn't gaze at the display, the device may enter Step 105, remaining in idle or standby status. If the device detects that the user has been looking at the display for a certain period of time and its idle time is beyond a given value simultaneously, the device may be programmed to grasp the opportunity and present a content window in Step 104. The new window may show information which a user may prearrange or show contents received over the network or from the Internet, like news update, event update, real-time broadcast, etc. As the user isn't running anything at the device, it doesn't interfere with the user's activity; and since the user is looking at the screen, contents presented may have a good chance to catch his or her attention. Next in Step 106, if the user moves sight away from the screen, indicating the user may be unwilling to watch it any longer, the content window may close in Step 110, and the display may return to the previous blank setting. Then the device may go back to idle state in Step 132. If the user keeps watching contents or keeps an eye on the screen, the device may stay engaged in Step 108, and the content window may remain on the screen. The contents may cover a wide range of subjects and may switch topics according to prearranged schedules.

Aside from turning idle time into informative or entertaining sessions, an idle user may also mean an opportunity for presenting certain special kinds of information. Take advertisements for instance. If an advertisement is introduced in the middle of a program which a user is running, it may offend the user due to the intrusive and disruptive nature. But if an ad is brought in at the end of a program, a user may prepare to leave or start another task, and thus may not have enough time or interest watching the ad, causing ineffectiveness of advertising effort. On the other hand, when a user is idle and is gazing at a blank screen, appearance of ads on the screen may be less intrusive and probably more acceptable and more effective. After all, the user has nothing to do and the ads may get enough attention. Moreover, the ad may have a chance to take a full screen, particularly valuable for devices having a small screen size such as smartphones. Ads presented on smartphones always have size issues due to limited screen dimension and lower priority status relative to what a user is doing or watching.

FIG. 4 is a schematic flow diagram illustrating another embodiment of presenting contents according to the present invention. In Step 112, a content window appears on a display. Occurrence of the window may be triggered by user's gaze, like what described in the above regarding the process in FIG. 3. Contents may be chosen by service providers or pre-selected by a user, or combination of both. If a user likes the content and keeps watching it, content window may stay for a while. But if the contents are not appreciated or a user wants to run another program, he or she may want to close the window right away. Thus in Step 114, the user may take action like pushing a key button, touching an icon on a touch-sensitive screen, or clicking on an object using a mouse. Then in Step 116, the content window shrinks to a much smaller size, or becomes an icon on the display. The window is not completely gone because a user may want to revisit it at a later time. In Step 118, if a user clicks on the shrunk window or icon, the content window may resume, and the contents may come back in Step 120. The user may start watching the previous contents, or play with the window to find more things of interest. If a user ignores the shrunk window in Step 118, the window may remain there for a given period of time and then go away, causing no nuisance to a user. In the meantime, the screen may return to the previous setting in Step 122. In the former case, after a user goes back to the contents in Step 120 and spends enough time, the user may close the window and reaches Step 122, resuming a previously paused session.

Returning to Step 104 of FIG. 3. When a user opens up a content window by gaze, he or she may watch it continuously, or close it with ease. FIG. 5 shows a schematic flow diagram to illustrate the situation in detail. In Step 124, a window is created on a display and contents are shown to a user. Meanwhile, the gaze direction of the user is monitored continuously. In Step 126, if it is detected that the user looks away from the display for a given period of time, Step 130 is implemented. The content window closes and the device may return to its idle or standby state. If the user keeps watching the display, it goes from Step 126 to Step 128, and the window remains open and contents are presented and refreshed per schedule in place. To provide convenience for a user, a cycle is designed, which consists of Step 126 to 128, then back to Step 126, and then to Step 128 or 130. As a result, a user may watch contents presented by the display on and on, and meanwhile the user may close the content window at any time by looking away from the display. And of course, a user may reopen the window any time by looking at the display or reopen the window by running certain application designed for such a purpose. Therefore, a user may choose to watch scheduled contents or walk away from it easily and conveniently.

Referring back to FIG. 1, sensor 20 may be employed to work together with sensor 10. For instance, sensor 20 may detect movement of a user. When a user approaches a device, sensor 20 may detect it and then the system may activate sensor 10 to detect the user's gaze direction. In other words, physical movement of user may be considered as a user input to control the device. In the meantime, the device may be designed to wake up from sleep state and return to standby state after sensor 20 detects a given signal. Since a motion detector may consume less power than an eye-tracking sensor, it saves energy and extends the battery life of a device.

Sensor 24 may be used to save energy of a device too. For example, when sensor 24 detects that a device's position is unstable or changes in an unusual way, the device may be configured to turn off sensor 10. Thus under such a circumstance, its display may remain blank or in screen-saver mode even when it is gazed by a user.

In addition, sensor 24 may be used to design another embodiment. For instance, a user may want to take initiative to lighten up a dark display and make use of standby or idle device in a simple and convenient manner. Suppose a user is looking at a blank screen of a standby smartphone 36, maybe at a subway station. The user may want to watch something to kill time, but doesn't have any idea about what to watch. So the user may follow the exemplary steps illustrated in FIG. 6 to start a content show which would be presented on the idling device. Let us assume shaking is selected as an input signal and a detector like sensor 24 is arranged to detect whether a device is shaken by a user or not. In Step 1, the user may shake smartphone 36 a bit. The shaking act is caught by the detector, which may send a signal to trigger a sensing process to ascertain whether the user gazes at the phone. For instance, a circuitry may be configured such that shaking may activate a gaze sensing system. Then in Step 2, the user may look at the phone screen or an eye 38 may gaze at it as in the figure, which is detected and next in Step 3, contents may show up on the screen. The contents may be selected by a service provider, including topics like instant news, weather forecast, promotions nearby, ads, and so on. Thus with a little shaking and some gazing, a user may get contents presented to him or her on an idle device instantly. Compared to the gaze-only scenario as described in FIGS. 2 and 3, the embodiment in FIG. 6 gives another option to users. It also avoids content shows caused by unintended gaze. Probably more important, the scheme saves energy as a gaze sensing system may be off most of the time unless getting activated upon receiving shaking signals.

Besides shaking, there are many other acts or other physical movements which may be employed as the first step to work with a dark screen and to view contents on it. For instance, tapping, scribbling or sliding on a touch-sensitive screen, or tapping on certain area of a device where sensitive sensors may be placed, may also be incorporated as the first indicator that a user may want to watch something on an idle device. It may depend on a specific app or program to specify what kind of physical move may be taken as an input for a device. If there is more than one option, a user may select a method which may seem more convenient and effective.

FIG. 7 shows an exemplary flow diagram to illustrate the embodiment depicted in FIG. 6 with more details. Assume that tapping is designated as the first signal needed. In Step 133, a device is in idle or standby mode except a tap sensor. The tap sensor, e.g., sensor 24 in FIG. 1, is powered on to detect tapping act performed by a user. A qualified tapping may be one tap or two consecutive taps with finger or hand. In Step 134, if no tapping is received, the device may stay in the original state, being idle or standby as in Step 140. If tapping is sensed, a gaze sensor may start working to detect whether a user gazes at the display in Step 136. Next in Step 138, if the user's sight is not on the display within a given period of time, the device may go to Step 140, returning to idle or standby state. If the user's sight or gaze turns to the display within a given period of time and the act lasts long enough, a content window may show up in Step 144. Then in Step 146, the gaze sensor may continue to monitor the user's gaze direction. If a user doesn't want to watch the contents, his or her gaze may be directed to elsewhere away from the device. Then the content window may close in Step 150 and the device may go back to an idle or standby mode in Step 152. If the user keeps watching the contents, his or her gaze stays with the device, and the content show may continue in Step 148.

CONCLUSION, RAMIFICATIONS, AND SCOPE

Thus it can be seen that systems and methods are introduced to utilize idle time slot for providing information.

The improved methods and systems have the following features and advantages:
(1). Idle or standby devices are used to present contents to idle users;
(2). Gazing direction is used to determine when to present contents to idle users and when to stop it; and
(3). Combination of tapping and gazing provides another way for idle users to utilize idle devices.

Although the description above contains many specificities, these should not be construed as limiting the scope of the invention but as merely providing illustrations of some of the presently preferred embodiments. Numerous modifications will be obvious to those skilled in the art.

Ramifications:

The content presentation method based on eye-tracking or gaze-sensing technology may be applied to cell phone, smart phone, smart watch, tablet computer, laptop computer, desktop computer, television, game player, digital billboard, or any other electronic devices or systems having a display and certain computing power.

Ambient light sensor may be added to a device to sense ambient light intensity, which may be used to determine whether the device is in a pocket or bag. If a device is not pulled out, results of motion sensor may be ignored in applications discussed here and in the above.

Speech recognition and/or voice generation function may be incorporated to make processes easy and smooth. For example after a content window is staged by user's gazing act, the window may be closed when a user simply says "No", if speech recognition technology is employed. Additionally, a content window may be arranged to show up quickly after a user says a predetermined word like "info" or "content" and then starts looking at the screen. A device may also generate a short speech to describe an info session after a content window is presented.

Furthermore, a content window may be configured to close by itself when certain motion is detected by accelerometer or gyroscope sensors, even though a user is still watching the screen, as it may be uncomfortable to view any content, or inappropriate to show any content in such conditions.

Moreover, a device may be equipped with a facial recognition system. The system may at least recognize a device owner, which may protect a user's privacy by not following other people's instructions, or may be used to present different information to different users according to pre-scheduled plans. The system may make use of the camera for gaze detection and employ facial recognition algorithms to identify people.

Lastly, to trigger a content window by gazing, the eye of a user may also fall on things located outside of a display but close to its edge, instead of looking directly at it. The reason is that, when a user looks at objects close to a display, contents shown on the display may also reach the eye, thus providing a viewing opportunity anyway. And hopefully, the user may turn his or her sight a bit to get a better reception of the contents. Moreover in many cases, instead of display, it may be enough to trigger a content show if a user just looks at an idling device for a given period of time, because it may mean both parties are available and the user may have a good chance to notice contents displayed on the device. In cases of smartphone and tablet computer, gazing at a device is almost equivalent to gazing at a display, because for these devices, a display may covers the whole area of one side.

Therefore the scope of the invention should be determined by the appended claims and their legal equivalents, rather than by the examples given.

The invention claimed is:
1. A system having a display or arranged for working with a display of an electronic apparatus, comprising:
1) connection component for connecting the system to an electronic device and/or a communication network;
2) sensing means for sensing a user and determining whether the user looks at a direction toward the display, wherein the sensing means is triggered by a user input after it is detected that the user input matches a prede- termined profile, the user input is generated by the user involving physical contact with the display or the apparatus; and 3) the system configured such that a task is performed when the display has an idle screen or a screen in inactive or in screen-saver mode and a watching time period goes beyond a predetermined value, wherein the task is unrelated to information presented before the idle-screen state, inactive mode, or screen-saver mode, the watching time period is measured when the user looks at a direction toward the display.

2. The system according to claim 1 wherein implementation of the task is stopped when the sensing means detects that the user looks at a direction other than the one toward the display for a predetermined period of time.

3. The system according to claim 1, further including shrinking means for shrinking a window presenting contents related to the task.

4. The system according to claim 1, further including identity recognition means, wherein the identity recognition means causes the system to stop performing the task when user identity doesn't match given criteria.

5. The system according to claim 1 wherein the task includes presenting at least one of the following items: news, alert, update, email, text message, sponsored contents, and other information.

6. The system according to claim 1 wherein the user input includes a pattern generated on a screen of the display by the user.

7. The system according to claim 1 wherein the task is performed continuously when the sensing means detects that the user keeps looking at a direction toward the display.

8. A method for performing a task using an electronic device, comprising:
 1) detecting a user input generated by a user involving physical contact with the electronic device or physical movement of the electronic device;
 2) determining whether the user input matches a predetermined profile;
 3) performing gaze detection after determining that the user input matches the predetermined profile;
 4) sensing the user and determining whether the user gazes at a direction toward the electronic device;
 5) measuring a gazing time period during which the user gazes at a direction toward the electronic device;
 6) monitoring whether the gazing time period exceeds a predetermined value; and
 7) performing a task when a display of the electronic device has an idle screen or a screen in inactive or in screen-saver mode and the gazing time period goes beyond the predetermined value, the task arranged unrelated to information presented before the idle-screen state, inactive mode, or screen-saver mode.

9. The method according to claim 8, further including stopping performing the task when it is detected that the user looks at a direction other than the one toward the electronic device for a predetermined period of time.

10. The method according to claim 8, further including shrinking a window presenting contents related to the task.

11. The method according to claim 8, further including identifying the user against given criteria and avoiding performing the task when an identification process fails to provide a positive result.

12. The method according to claim 8 wherein the task causes the display to present at least one of the following items: news, alert, update, email, text message, sponsored contents, and other information.

13. The method according to claim 8, further including sensing and implementing voice commands of the user.

14. The method according to claim 8, further including performing the task continuously when it is detected that the user keeps looking at a direction toward the electronic device.

15. A method for performing a task using an electronic device, comprising:
 1) monitoring the electronic device and/or physical movement of the electronic device to sense a user input;
 2) determining whether the user input matches a predetermined profile;
 3) performing gaze detection after determining that the user input matches the predetermined profile;
 4) sensing the user and determining whether the user gazes at a direction toward the electronic device;
 5) measuring a gazing time period during which the user gazes at a direction toward the electronic device;
 6) monitoring whether the gazing time period exceeds a predetermined value; and
 7) performing a task when a display of the electronic device has an idle screen or a screen in inactive or in screen-saver mode and the gazing time period goes beyond the predetermined value, the task arranged unrelated to information presented before the idle-screen state, inactive mode, or screen-saver mode.

16. The method according to claim 15, further including stopping performing the task when it is detected that the user looks at a direction other than the one toward the electronic device for a predetermined period of time.

17. The method according to claim 15, further including identifying the user against given criteria and avoiding performing the task when an identification process fails to provide a positive result.

18. The method according to claim 15 wherein the task causes the display to present at least one of the following items: news, alert, update, email, text message, sponsored contents, and other information.

19. The method according to claim 15, further including sensing and implementing voice commands of the user.

20. The method according to claim 15, further including performing the task continuously when it is detected that the user keeps looking at a direction toward the electronic device.

\* \* \* \* \*